US005534893A

United States Patent [19]

Hansen, Jr. et al.

[11] Patent Number: 5,534,893
[45] Date of Patent: Jul. 9, 1996

[54] METHOD AND APPARATUS FOR USING STYLUS-TABLET INPUT IN A COMPUTER SYSTEM

[75] Inventors: Daniel J. Hansen, Jr., Cupertino; Michael L. Gough, Ben Lomond; J. Rhoads Hollowell, Sunnyvale, all of Calif.

[73] Assignee: Apple Computer, Inc., Cupertino, Calif.

[21] Appl. No.: 167,709

[22] Filed: Dec. 15, 1993

[51] Int. Cl.$^6$ ............................................. G09G 3/02
[52] U.S. Cl. ............................ 345/179; 345/156; 178/18
[58] Field of Search .............................. 178/18, 19, 20; 364/3, 13; 345/156, 173, 174, 175, 179, 180; 382/315

[56] References Cited

U.S. PATENT DOCUMENTS

| | | | |
|---|---|---|---|
| 4,739,317 | 4/1988 | Berry et al. | 340/723 |
| 4,812,832 | 3/1989 | Oishi et al. | 340/709 |
| 4,821,030 | 4/1989 | Batson et al. | 340/712 |
| 4,992,630 | 2/1991 | Mletzko | 178/18 |
| 5,063,600 | 11/1991 | Norwood | 345/173 |
| 5,121,442 | 6/1992 | Togawa et al. | 382/13 |
| 5,157,737 | 10/1992 | Sklarew | 382/13 |
| 5,218,645 | 6/1993 | Bacus | 382/6 |
| 5,220,649 | 6/1993 | Forcier | 395/148 |
| 5,252,951 | 10/1993 | Tannenbaum et al. | 345/156 |
| 5,260,697 | 11/1993 | Barrett et al. | 345/179 |
| 5,272,470 | 12/1993 | Zetts | 345/173 |
| 5,414,228 | 5/1995 | Yamashita | 178/18 |

FOREIGN PATENT DOCUMENTS

0383304A2  8/1990  European Pat. Off. ........ G06K 11/12

OTHER PUBLICATIONS

Valdes, Ray, "DDJ Handprinting Recognition Context Wrap-up", Dr. Dobb's Journal, Jan. 1993.
"Using Penpoint" Developer Release Operators Manual for PenPoint Operating System, by Go Corporation, Foster City, Calif.

*Primary Examiner*—Jeffery Brier
*Assistant Examiner*—Doon Chow
*Attorney, Agent, or Firm*—Hickman Beyer & Weaver

[57] ABSTRACT

A stylus-aware computer system and method are provided for processing information obtained by moving a stylus over a tablet of the type that displays images as well as inputs stylus information. As a user moves the stylus with respect to the tablet, the tablet generates outputs describing the position of the stylus with respect to the tablet. A tablet driver converts this data into standardized packet objects recognized by the computer system and sends the packet objects to a stroke manager. The stroke manager converts the package objects to stroke objects which represent the trajectory of the stylus with respect to the tablet at times between two transitions such as placing the stylus on the tablet and lifting the stylus off the tablet. The stroke manager notifies an application of the stroke object through an event queue. The application may then issue stroke commands which dictate how the stroke is used. The stroke may, for example, be drawn on the tablet, erased from the tablet, removed from memory, etc.

30 Claims, 12 Drawing Sheets

FRAME

| 1 | 0 | 1 | 1 | 0 | 1 | 1 | 1 |

*Fig. 9b*

TEMPLATE (1)

| 0 | 1 | 1 | 0 |

*Fig. 9c*

TEMPLATE (2)

| 1 | 1 | 1 | 1 |

*Fig. 9d*

METHOD AND APPARATUS FOR USING STYLUS-TABLET INPUT IN A COMPUTER SYSTEM

BACKGROUND OF THE INVENTION

This invention relates generally to computer systems, and more particularly to pen-aware graphical user interfaces for computer systems.

Graphical user interfaces or GUIs are becoming increasingly popular with computer users. Many people find that computers having GUIs are easier to learn and use than comparable computers without GUIs.

A relatively new type of computer which is well suited for graphical user environments is the pen-based or pen-aware computer system, hereinafter generically referred to as a "pen computer system", "pen computer", "stylus-aware computer system", or the like. A pen-based computer system is typically a small computer (e.g. a hand-held computer) in which a "pen" or stylus is the primary device for inputting data. A pen-aware computer system accepts pen inputs in addition to other, more traditional, inputs (e.g. keyboard and mouse inputs). Often a pen-aware computer is simply a conventional computer that has been modified to accept pen inputs.

A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). When operating as an output device, the display assembly presents computer-generated images on the screen.

Typically, graphical images can be input into the pen computer systems by merely moving the stylus across the surface of the screen, i.e. making a "stroke" on the screen. One type of stroke is defined as the engagement of the screen with a stylus, the movement of the stylus across the screen (if any), and its subsequent disengagement from the screen. As the CPU senses the position and movement of the stylus, it can generate a corresponding image on the screen to create the illusion that the stylus is drawing the image directly upon the screen, i.e. that the stylus is "inking" an image on the screen. With suitable recognition software, the inked image can be recognized as text and/or numeric information which can then be used by conventional routines in the computer system. Such recognition methods are well known to those skilled in the art.

As pen-computer technology evolves, it would be useful to make that technology available for use in conventional computer systems (i.e., computers that are not pen-aware) while retaining the ability to use the currently available operating systems and applications with only minor modification. For some applications, the pen will simply direct a cursor across the screen much like the cursor keys or mice do in conventional computer systems. For more advanced (pen-aware) applications, the system will recognize pen strokes as objects and makes use of them as text or graphics objects, for example.

Truly flexible pen-aware computers should be able to use different types of available pen-tablet systems. However, as more dual-function displays become available, the computer system must be able to handle correspondingly more types of display data. Numerous dual-function displays such as the Gazelle and the Wacom Z are now available. These various products provide data in differing formats and at differing speeds. Thus, the pen-aware system should be able to handle a wide range of data formats. In addition, the system should be able to utilize the range of information provided by the various pen-input systems. Each pen-input system provides positional information describing the location of the pen on the display. In addition, some input systems provide the pressure of the pen on the screen, the distance between the pen and the screen, the tilt of the stylus on the screen, etc. Still further, some display assemblies employ more than one pen, each of which has a different function. Alternatively, some systems provide a pen that has various modes that can be selected by pushing a button, for example. Each of these pens or modes can provide unique functions much like a function key on a standard keyboard. There is a need for a system that can recognize and use data from the various types of display.

In addition, it would desirable for the computer system to react rapidly in response to the data it receives from the pen-input and to the instructions it receives from higher level applications. Unfortunately, some computer systems require certain time-consuming steps whenever a stroke is input or used. For example, some systems must copy a stroke or other object to or from an application before the stroke can be used. Further, some types of system require that the user supply instructions before the system can recognize different modes (e.g., different types of strokes). These and other time-consuming steps can prevent current systems from responding to stylus-tablet inputs in real time.

SUMMARY OF THE INVENTION

The present invention provides a stylus-aware ("pen-aware") computer system including a stylus with which a user writes on a tablet (i.e., the input part of a dual-function display). The system divides the user's writing into "strokes" defined by the stylus trajectory between two stylus transitions. The transitions bounding a stroke may be, for example, placing the stylus on the tablet and then lifting the stylus off the tablet. As a user moves the stylus with respect to the tablet to create a stroke, the tablet generates time-varying stream of "tablet data" describing the position of the stylus with respect to the tablet. The system first converts this tablet data into discrete "packet objects" describing the position (and status) of the stylus on the tablet at a given instant in time. The packet objects are then converted to logical units known as "stroke objects" which represent the trajectory of the stylus with respect to the tablet at times between two successive stylus transitions. Each time a stylus transition is encountered, the stroke object being created is closed and a new stroke object is started. Various applications in the computer system can use the stroke objects by issuing "stroke commands" dictating how the stroke is to respond. The stroke command may require, for example, that the stroke be drawn on a display, erased from the display, removed from the system, etc. Each of these commands can be executed without requiring that the application copy the stroke object, thus realizing a considerable time savings.

In one aspect, the present invention provides a method of using tablet data in a stylus-aware computer system. First, tablet data is directed to an "ink pool", which is memory where the individual stroke objects are assembled and stored as a linked list. The ink pool is preferably independent of—but available to—all applications in the computer system. Thus, the applications can simply issue commands to stroke objects in the ink pool without actually copying the individual stroke objects. Within the system, only certain applications ("stylus-aware" applications) utilize the many attributes of these stroke objects, and the system preferably determines which applications these are. If the application is stylus-aware, the system informs that application of stroke events, and the application can, in turn, issue one or more stroke commands to specified stroke objects within the ink pool. These stroke commands may require that the stroke object produce an image of the stroke itself on a display, for example. If an application is not stylus-aware, it may still use the stroke object, but only for limited purposes. Typically, such applications use the stylus only to control the cursor position on the display.

The tablet data from the tablet may have various forms depending upon the type of tablet used. Thus, preferred computer systems first identify the type of tablet sending the data and then convert that data into standardized packet objects that are recognized by the computer system. The packet objects so created may contain a variety of information and preferably one or more of the following: the x, y, and z Cartesian coordinates of the stylus on the tablet, the proximity of the stylus to the tablet, the tilt of the stylus on the tablet, and any special functions associated with the stylus (as noted some styluses have a button or other toggle that controls special functions analogous to function keys on a standard PC keyboard). As for the proximity of the stylus to the tablet, some systems provide positional data when the stylus approaches—but does not touch—the tablet to within a fixed distance (e.g., less than one or one-half inch).

In preferred embodiments, stroke objects are prepared from packet objects by a process in which each stroke object has a specified "stroke type." The stroke type is determined by the "packet type" of the packet objects that make up the stroke object. As noted above, strokes are delimited by two transitions. Thus, for example, a single stroke may be defined by the following events: (1) placing the stylus onto the tablet, (2) moving the stylus across some region of the tablet, and (3) removing the stylus from the tablet. By placing the stylus on the tablet, the stroke type is defined, i.e., a "stylus-down" stroke. Other stroke types include proximity strokes in which the stylus is close to but not touching the tablet, and function strokes in which a special function of the stylus has been activated prior to the stroke. When a new packet object is received, the system first determines whether its type is the same as that of the stroke object in progress (i.e., the stroke currently being created). If so, the packet object is appended to that stroke object. Each new packet object received thereafter is also appended to the stroke object in progress until a packet object having a different type is encountered. At that point, the stroke in progress is completed and an new stroke—of the new packet object's type—is opened. The new packet object is incorporated in the new stroke object.

In another aspect, the present invention provides stylus-aware computer systems. These systems include a tablet driver which receives binary tablet data from a tablet. The tablet driver contains a tablet template library which is consulted to recognize the type of tablet sending the data. Once the tablet type is identified; the tablet driver converts the data to standardized packet objects at specified time intervals. The packet objects are sent from the tablet driver to a stroke manager which creates stroke objects in the ink pool. The stroke manager also passes stroke events to an event queue so that applications in the system become aware of particular stroke objects. Application that are stylus-aware may then issue stroke commands dictating how the stroke object is to be used. Applications that are not stylus-aware may also use the stroke objects but only to control the location of a cursor. The stroke manager and tablet driver are invisible to the computer's operating system.

As will be apparent from the discussion below, the present invention has several advantages. For example, it can be used with many different commercially available tablets, and it will automatically identify the type of tablet sending tablet data. In addition, the method and apparatus of this invention permit conventional applications (from non-pen based systems) to be used with pen-based systems with only slight modification. Further, by storing stroke objects in an ink pool memory, each application can use the ink objects it needs without first copying them. Thus, many processes using stroke objects are substantially speeded up.

A further understanding of the invention can be obtained by reference to the following detailed descriptions and associated figures of the drawings.

BRIEF DESCRIPTION OF THE DRAWINGS

FIG. 9b shows a frame of tablet data used to identify a tablet used with this invention;

FIGS. 9c and 9d show two exemplary tablet templates used with the frame of FIG. 9b;

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware ("pen") system.

Figure 1:
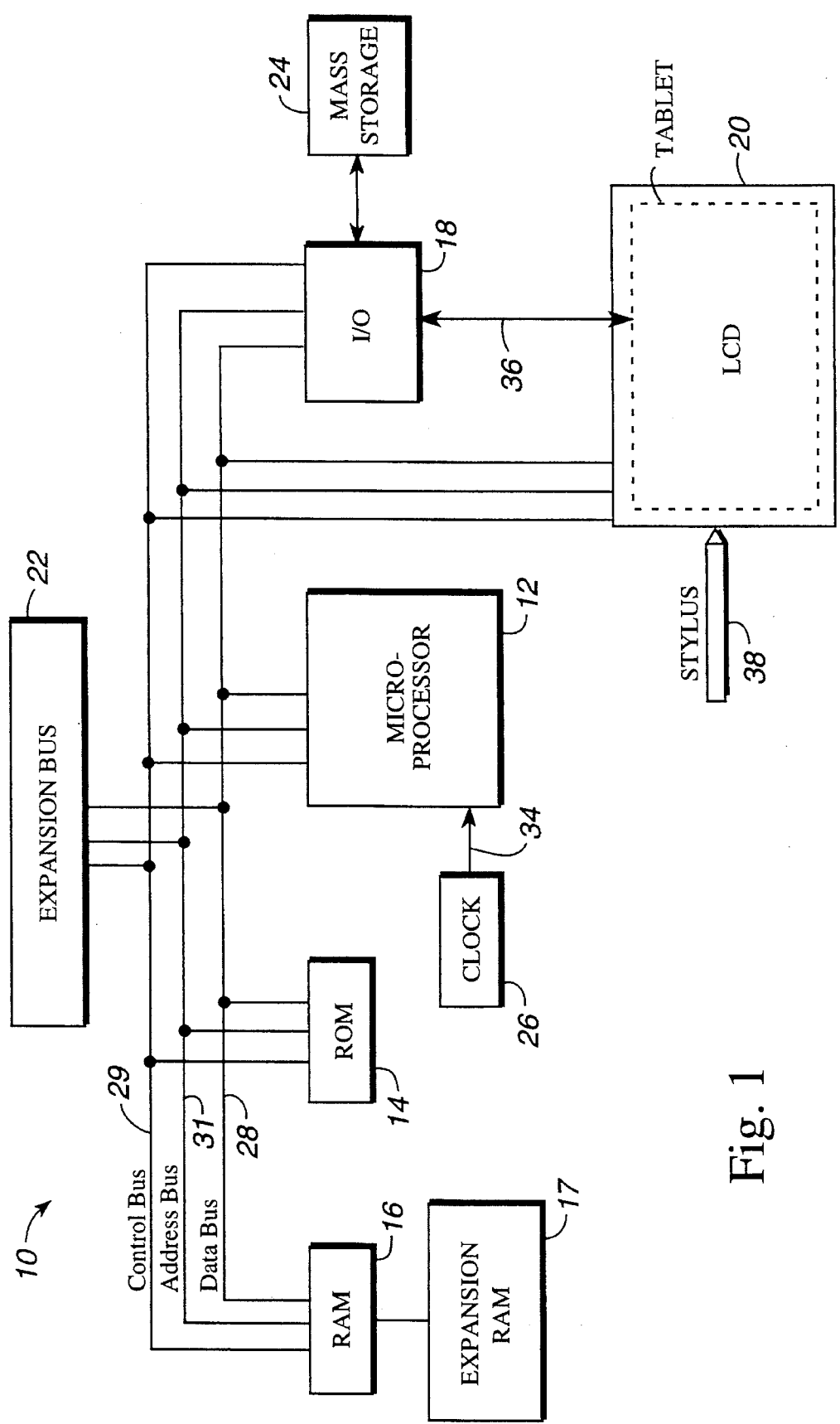
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 can be a liquid crystal display (LCD) of the type commercially available from a variety of manufacturers. The input device ("tablet") of display assembly 20 can be a thin, clear membrane which covers the LCD display and which is sensitive to the position of a stylus 38 on its surface. Alternatively, the tablet can be an embedded RF digitizer activated by an "active" RF stylus. Combination display assemblies are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 can be provided with a backup battery to prevent the loss of data even when the pen computer system 10 is turned off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information includes the Cartesian (e.g., x & y) coordinates of a pixel of the screen of display assembly 20 over which the tip of the stylus is positioned. Other information may include the z coordinate, the tilt of the pen, the proximity of the pen to the screen, and the status of the pen (e.g. whether a button is depressed on the pen). Commercially available combination display assemblies include appropriate circuitry to provide the stylus location information as digitally encoded data to the OF circuitry of the present invention. The display assemblies provide the location information in various formats and by various techniques. For example, some systems check the pen location at regular intervals, other systems take the data as fast as it is available, and still other systems do a raster scan of the display assembly. The CPU 12 then processes the data under control of an operating system and an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphones, speakers, etc. to the CPU 12.

Figure 2:
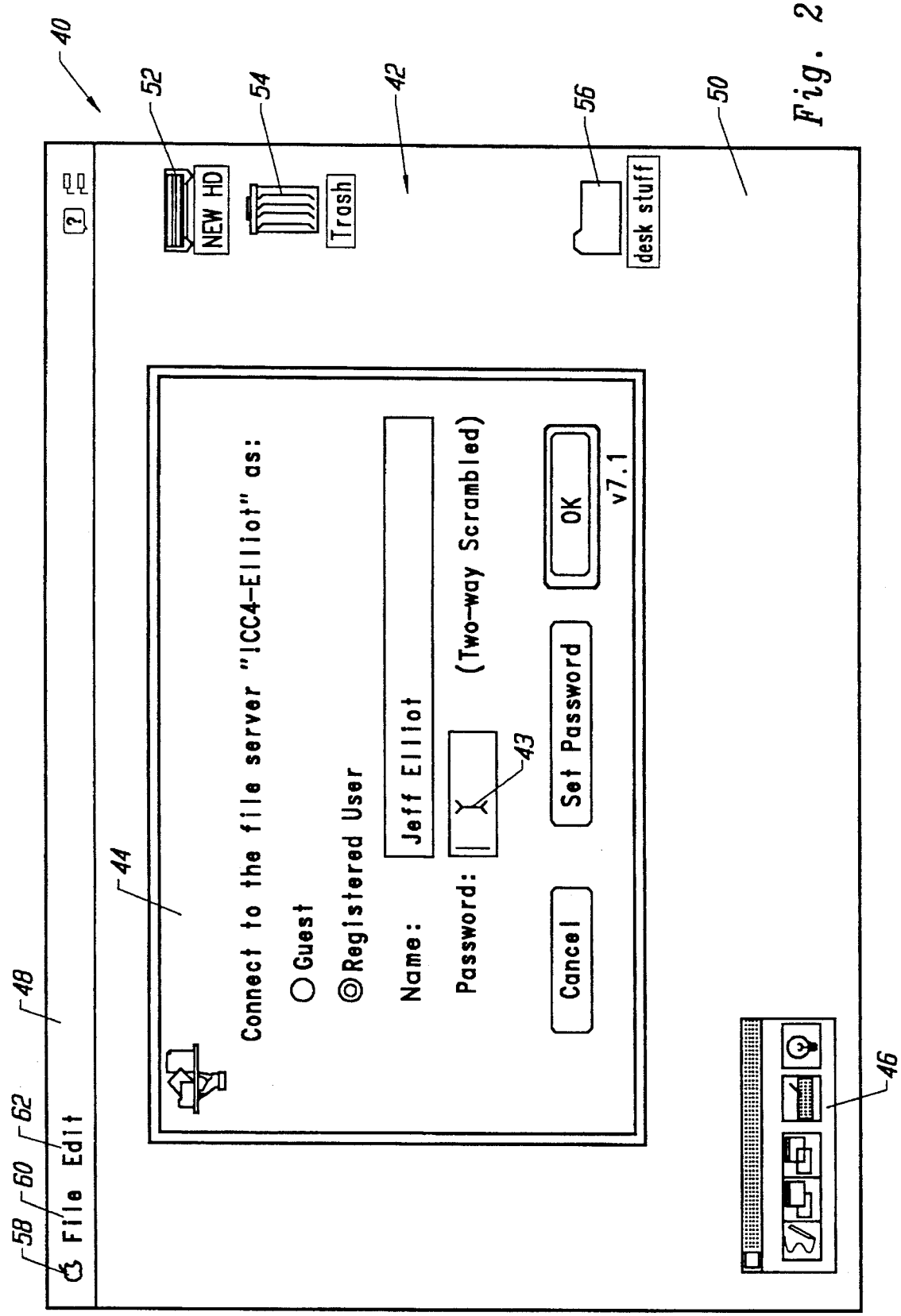
FIG. 2 is a view of a Macintosh computer screen showing a desktop, a window produced by an application program called "AppleShare" and a utility program known as "Pen-Board"

In FIG. 2, a screen 40 of a Macintosh computer system made by Apple Computer, Inc., of Cupertino, Calif., includes a desktop image 42 produced by a Macintosh operating system, a window 44 produced by a "AppleShare" application program made by Apple Computer, Inc., and a palette 46 produced by a small application program or "utility" known as "PenBoard" made by Apple Computer, Inc. The desktop 42, which includes a menu bar 48 and a desk area 50, often displays a number of icons 52, 54 and 56, which represent different objects or functions. For example, the icon 52 represents a hard disk drive; icon 54 represents the "trash can" in which files can be deleted; and icon 56 represents a folder which can contain applications and documents of various types. The menu bar 48 preferably includes a number of labels 58, 60, and 62 for pull-down menus, as is well known to Macintosh users. The desktop also includes a cursor 43 in window 44. As is well known to those of skill in the art, a cursor may be moved to different positions on the desktop and assume different forms. The cursor 43 is shown in a text insertion form with a "password" field of window 44. The cursor may take the form of an arrow as it moves to other locations on the desktop.

As mentioned previously, the desk top 42 is created by the operating system (sometimes referred to as the "Finder"). The Finder can be considered to be a specialized form of application program which displays an image on the entirety of the screen 40. In other words, the "window" size of the desk top 42 is the same size as the screen 40. The application program AppleShare which creates the window 44 typically does not take over the entire screen 40. Similarly, the palette 46 (which is just a specialized form of window) is produced by the PenBoard application, and does not occupy the entire space of the screen 40.

Many of the components and data packages employed in the system of this invention take the form of "objects." As is well known to software developers, an "object" is a logical software unit comprising data and processes which give it capabilities and attributes. For example, an object can be queried as to its type and can return such data as the number of words that it contains, what its location is, etc. Objects can contain other objects of the same or of a different type. Objects can also be used to project images on a screen according to their object type. Example of object types used in the following description include packet, stroke, and process objects. There are many well known texts which describe object oriented programming. See, for example, *Object Oriented Programming for the Macintosh*, by Kurt J. Smucker, Hayden Book Company, 1986.

Figure 3:
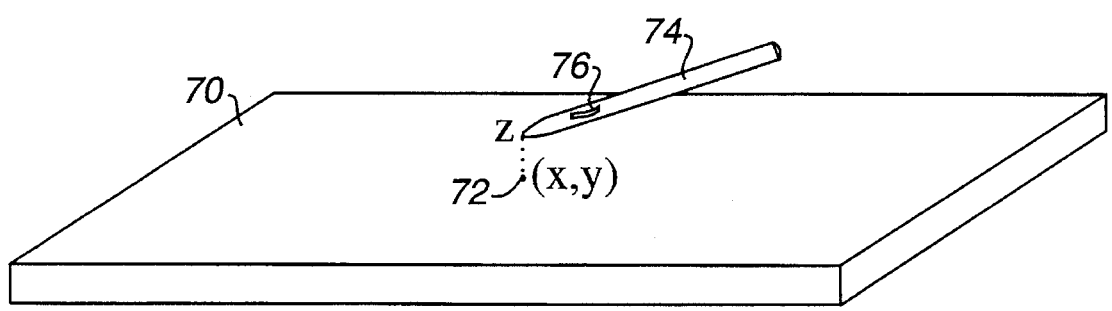
FIG. 3 is a view of a pen and dual function display in accordance with the present invention.

As shown in FIG. 3, an input system of the present invention includes a tablet 70 with which a stylus 74 can input "handwritten" information such as text, graphics, tables, formulas, etc. The tablet 70 is preferably part of a dual-function display in which the input handwriting is displayed (inked) as it is written. The stylus 74 interacts with the tablet 70 at point 72 which has defined x, and y coordinates in a frame of reference within the tablet. Typically, the user will write on the tablet surface so that the z coordinate does not noticeably vary during the writing process. Some tablets, however, sense and record the z position or depression in the tablet surface caused by the pressure of the stylus. In addition, some tablets (e.g. RF tablets) will register movement of the stylus even when it is above the tablet surface. Such tablets may be used to track the user's hand when moving between marks in a handwritten word or letter (e.g., between the horizontal and vertical strokes of a small-case "t"). Typically, the tablet will only monitor such movement when the stylus is within a specified distance of the tablet surface, preferably less than about one inch and more preferably less than about one-half inch.

In some embodiments, the stylus 74 will include a button or toggle 76 that may be switched by the user. Such a button can be used to indicate alternate modes much like the option, and command keys on Macintosh keyboards specify additional modes. Thus, a single trajectory of a stylus across the tablet surface can result in different strokes depending upon the mode of the stylus.

In operation, the user grips the stylus and writes on the surface of the tablet much like he or she would write with a pen or pencil on a sheet of paper. However, with a stylus and tablet as used in this invention, much more information can be imparted. For example, the position of the stylus can be recorded even before it touches the tablet. When the user writes on a piece of paper, only the points where the pen or pencil touch the paper are recorded, although the writing angle and pressure applied by the user may also be reflected by the line thickness and darkness, for example. In a typical stylus and tablet employed in the present invention, the following sequence of events are important. First, the user will approach the tablet with the stylus. At some point, preferably one-half to one inch from the tablet, the input system will register a "stroke event" or transition from one writing state to another. In this example, the system was initially in a state in which no information was being provided to the system for the stylus. When the stylus moved to within a certain distance of the tablet (e.g. one inch) a stroke event occurred and the tablet began generating position data, tracking the position of the stylus. Next, the user touches the tablet with the stylus creating another stroke event. The tablet still tracks the position of the stylus but recognizes that a different type of stroke is being generated. If the user is writing a word such as "write" in cursive, he or she will have to go back and cross the "t" and dot the "i"
after the main part of the word is entered. Each time he or she lifts the stylus, a stroke event recognized by the tablet occurs.

As the tablet generates data registering stroke events and recording the position of the stylus with respect to the tablet, the system of this invention is converting that information into objects referred to as "stroke objects" which are recognized and used by applications in the computer system. Such applications may be, for example, text processing applications, spreadsheets, graphics applications, handwriting recognition applications, data entry applications, and other high level data processing programs. Applications for conventional computers (non-stylus-tablet computers) are modified slightly to accept stroke objects, but can maintain their non-stylus functions. Each stroke object includes a series of points between two successive stroke events. Each point describes the position of the stylus with respect to the tablet at a particular time after the initial stroke event. Thus, each stroke object may be characterized as a "stylus-down" (the stylus touches the tablet) stroke object or an "in proximity" (the stylus is within a certain distance of the tablet) stroke object, depending upon the stroke event preceding the stylus movement recorded in the stroke object. Other types of strokes such as "function strokes" (the function button on the pen has been depressed) are also recognized by the tablet. Applications use stroke objects in various ways. For example, they can simply draw the stroke on a display, they can remove the stroke from memory, they can erase the stroke from the display without removing it from memory, they can use stroke to move a cursor on the display, etc. In general, the observed output of the system of this invention will depend upon the application using the stroke object.

Figure 4:
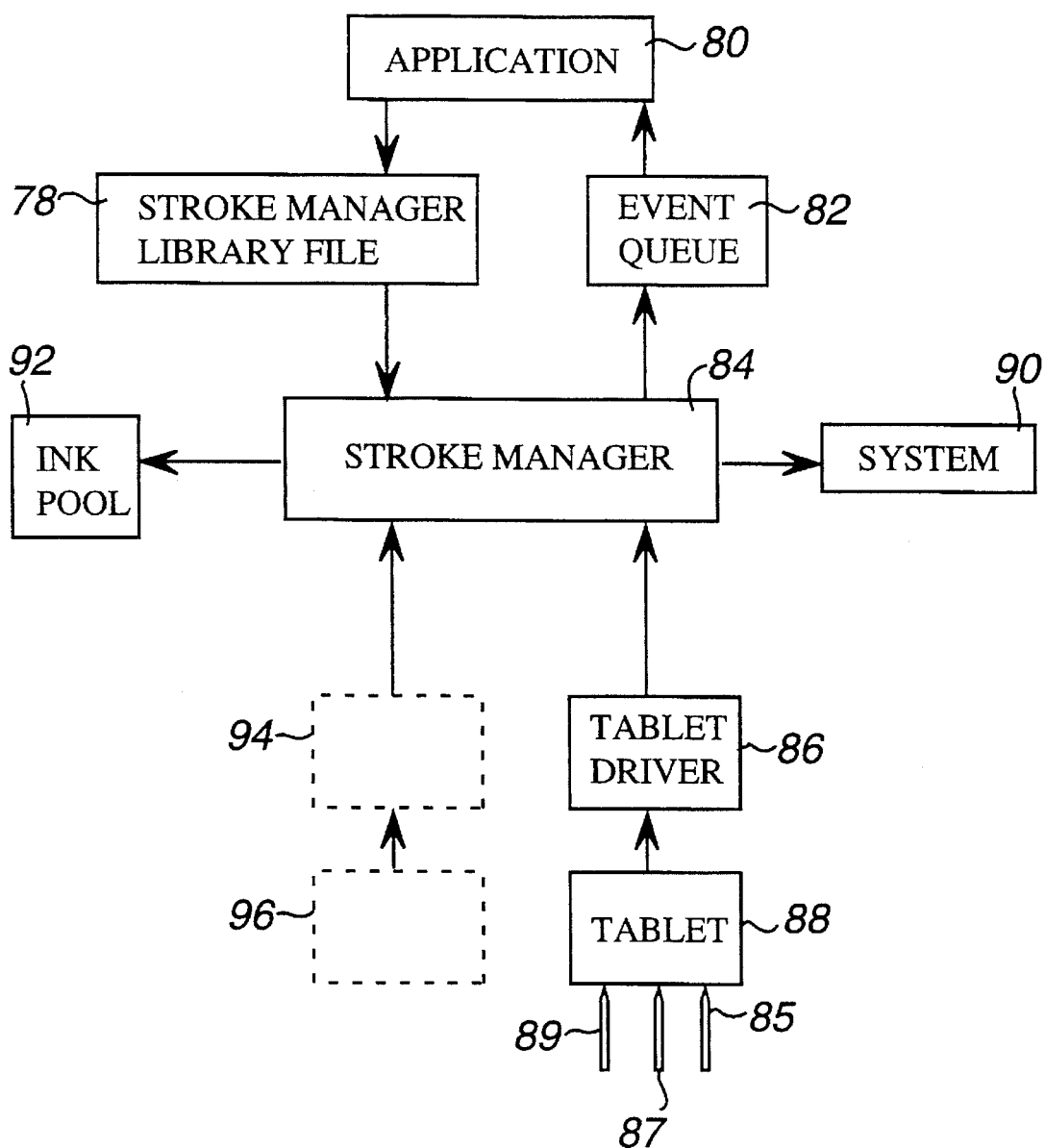
FIG. 4 is a block diagram of a tablet data processing system showing how data flows to and from a stroke manager.

FIG. 4 is a block diagram of a preferred computer system of the present invention. A set of styluses 85, 87, and 89 may be available for writing on tablet 88 as described above. Each stylus has its own ID and may define a particular type of stroke, e.g. a "red" stroke, a "blue" stroke, etc. As the stylus(es) make strokes on the tablet, the stylus-tablet interaction parameters (e.g. positional information associated with the stroke) are converted to a stream of tablet data that is sent to a tablet driver 86. The positional information may include one or more of the following: the x, y, and z Cartesian coordinates of the stylus on the tablet, the tilt of the stylus with respect to the tablet, the function setting of the stylus (as controlled by button 76, for example), whether the stylus is in close proximity to the tablet, the time, the pressure of the stylus on the tablet, and rotation. The tablet data may also include the stylus ID as well as other information concerning the most recent stroke event.

Because the tablet data from different tablets comes in different formats, the system must repackage the tablet data at a low level into a standard form that can be used by various system elements. The tablet driver 86 performs this function by preparing packet objects which are objects containing some or all of the positional information listed above at a point in time.

The tablet driver sends the packet objects it creates to a stroke manager 84 which assembles them in the order in which they are received to create logical stroke objects describing the trajectory of the stylus with respect to the tablet. Stroke objects are the basic unit of stylus-tablet input used by applications in this invention. As noted above, a new stroke object is started whenever a stroke event (stylus "transition") occurs. In addition to assembling stroke objects, stroke manager 84 sends information concerning the stroke objects to an event queue 82 which holds that information until an application 80 is notified. The event queue's 82 general role is to store "events" occurring within the system for action by applications. Such events include key presses from the keyboard, disk insertions from a disk drive, mouse clicks from the mouse, as well as stroke events from the tablet. The stroke manager 84 also communicates with the remainder of the computer system 90 through registers, latches, etc.

The packet objects received by the stroke manager are assembled into stroke objects within an "ink pool" 92 section of memory. In addition to the stroke-in-progress (or current stroke), the ink pool contains a linked list of stroke objects, each of a specified type (e.g. stylus down or in proximity strokes). The stroke objects are held in the ink pool in the order in which they were created, with each object having a pointer pointing to the immediately preceding object. Thus, it is easy to identify the oldest stroke object for example.

Applications that make use of stylus-tablet input can be grouped into two classes: those that treat the stylus as a stylus (i.e., they recognize stroke objects and are deemed "stylus-aware") and those that treat the stylus as a mouse. Applications that treat the stylus as a mouse simply use the movement of the stylus on the tablet to control the cursor position on the screen. The stroke manager 84 distinguishes between applications that use the stylus as stylus and applications that use the stylus as cursor with a stroke manager library file 78 attached to the application. When an application loads, the stroke manager looks at an appropriate identifier (e.g. a few bits) in the library file to determine whether the application is stylus-aware. If the application is not stylus-aware, the stroke manager simply sends a mouse-down events to the event queue when stroke events occur. If on the other hand, the stroke manager library file 78 indicates that the application is stylus-aware, the stroke manager 84 sends more complete stroke information to the event queue 82 when stroke events occur. The stylus-aware application then acts accordingly.

Typically, the computer system will have only a single tablet. In some cases, however, the system will have two or more tablets connected and generating tablet data at one time. For each such additional tablet 96, the system employs an additional tablet driver 94 which converts tablet data from the tablet into packet objects for the stroke manager. The stroke manager keeps the sources separated while creating two or more stroke objects at the same time.

Figure 5:
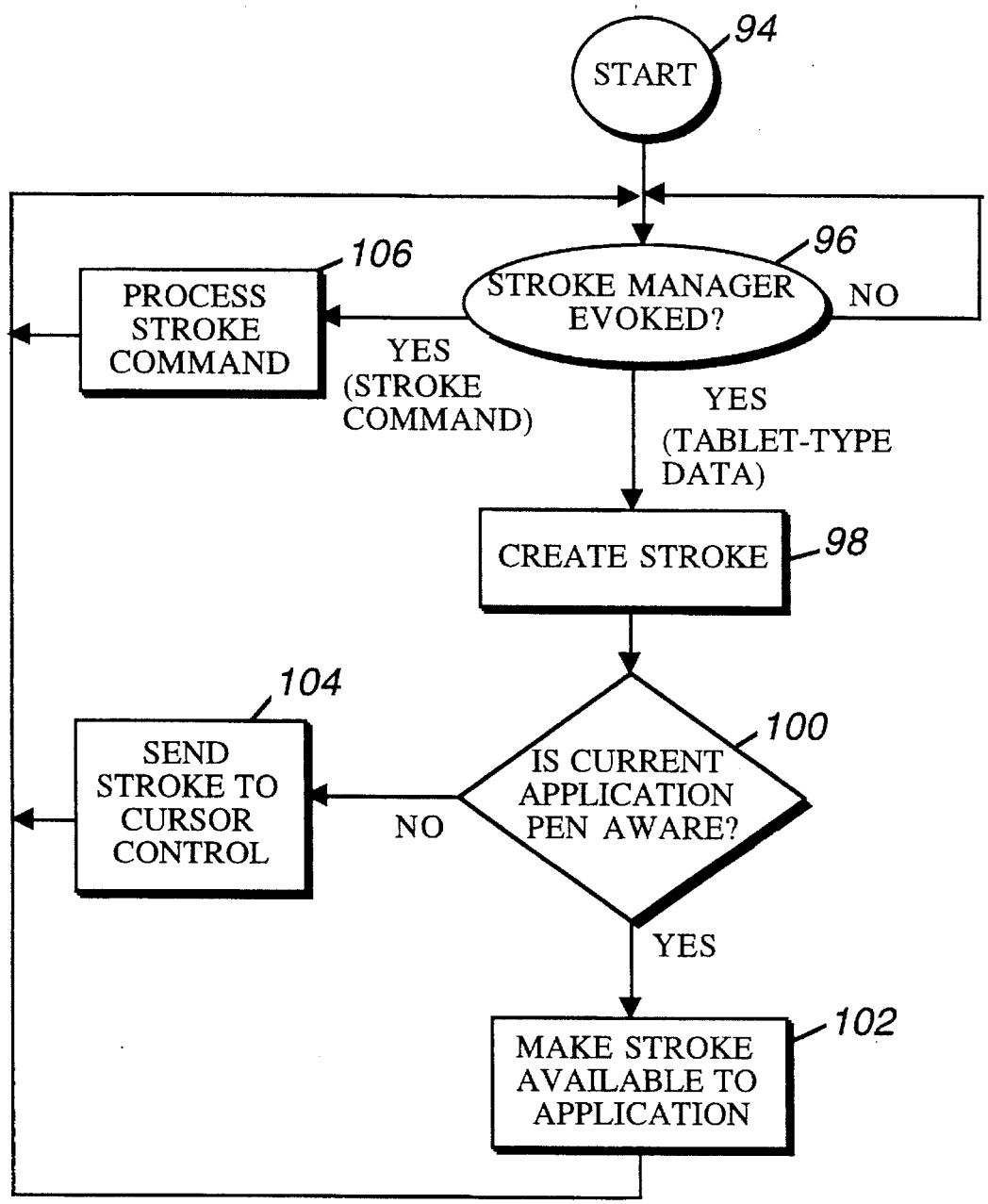
FIG. 5 is a process flow diagram showing the general steps employed in managing the interface between a dual-function display and an application.

Referring now to FIG. 5, an overview of the computer-implemented processes of this invention is depicted. After the process begins at step 94, a conditional step 96 determines whether the stroke manager has been evoked by either tablet-type data or a stroke command. Tablet-type data refers to both (1) tablet data described above from a tablet or (2) a stroke object that is disassembled into packet objects and fed to the stroke manager. The later case will arise if an application issues a stroke command directing a stroke object to "play itself" as described below. If the stroke manager is evoked by tablet-type data at conditional step 96, a stroke is created at process step 98. Next, decision step 100 determines whether the current application is pen-aware (stylus aware). Again, this is accomplished by looking to an "identifier" in the library file. If the current application is pen-aware, the stroke is made available to that application at process step 102 and process control returns to step 96.

If the stroke manager is evoked by a stroke command (rather than tablet-type data) at conditional step 96, that stroke command is processed in a process step 106 and the system then returns to step 96. After a stroke object is made available to an application, the application can issue one or more stroke commands which describe simple actions for the stroke object. Further details of stroke commands will be described below.

If an application is not stylus-aware, it can still make use of the stroke for limited purposes. Unlike a stylus-aware application, however, it can not issue stroke commands to ink objects. Rather, the non-stylus-aware application uses the stroke to control the position of the cursor on the screen. Thus if the logic determines that the application is not stylus-aware at decision step 100, the stroke is sent to cursor control at process step 104. Thereafter process control returns to step 96. When a stroke is sent to cursor control, a "mouse-down" event is sent to the event queue. In response, the application views the stroke as a cursor (pointer) move. Thus, if the user begins a stroke at a point (x1, y1) and moves to (x2, y2), the cursor will follow the stroke trajectory, ending at (x2, y2).

Figure 6:
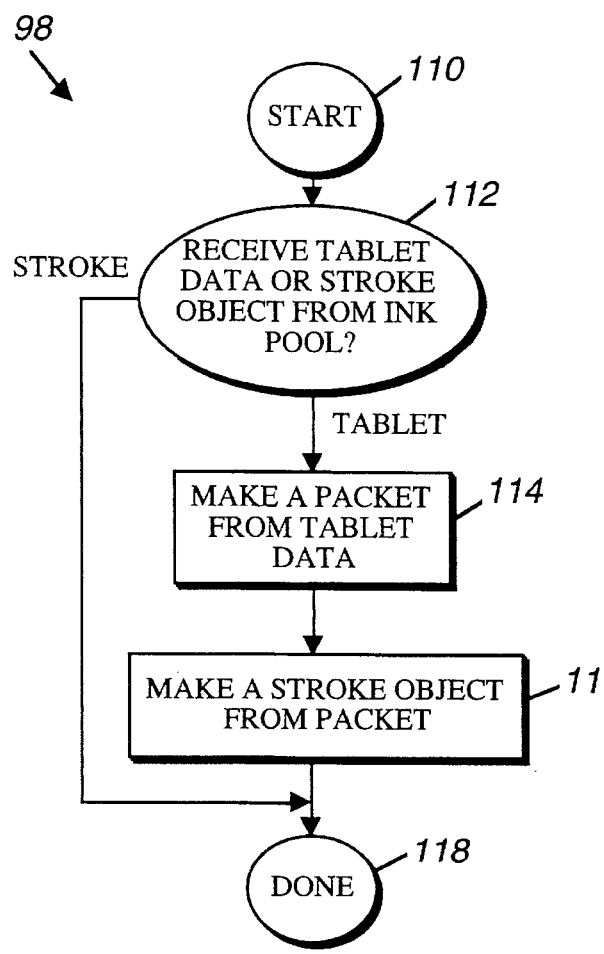
FIG. 6 is a process flow diagram showing how a stroke is created from tablet data in accordance with the present invention.

FIG. 6 is a process flow chart detailing the steps employed to create a stroke object (i.e., step 98 of FIG. 5). The process is started at step 110 and proceeds to conditional step 112 where it is determined whether the system is receiving tablet data or a stroke object. As noted above, both of these forms of data can be considered "tablet-type data." If a stream of tablet data is being received, the process proceeds to step 114 where packet objects are made. As explained above, packet objects contain positional information describing the relationship of the stylus with respect to the tablet at points in time. Unlike tablet data from a tablet, packet objects have a standard format that is independent of the type of tablet generating the tablet data. The steps employed in making packet objects will be described in more detail below. The system assembles the packet objects formed at process step 114 into a stroke object at process step 116. At this point, the process of creating a stroke object is complete as indicated at step 118. The procedure for preparing stroke objects is also described in more detail below.

If the system receives a stroke object from the ink pool (rather than tablet data), conditional step 112 directs process control to step 118 where the process is complete. Because the system has received a completed stroke object at step 112, no further processing is required to prepare a stroke object.

Figure 7A:
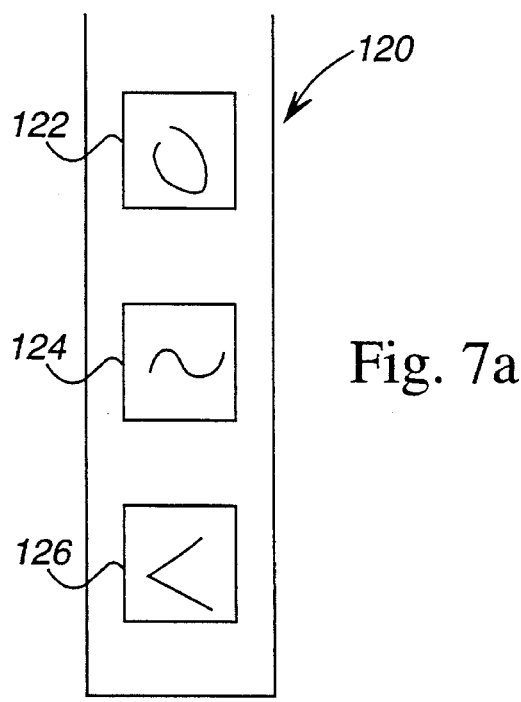
FIGS. 7a–7c are block diagrams showing an ink pool, a stroke object, and a packet respectively.
Figure 7B:
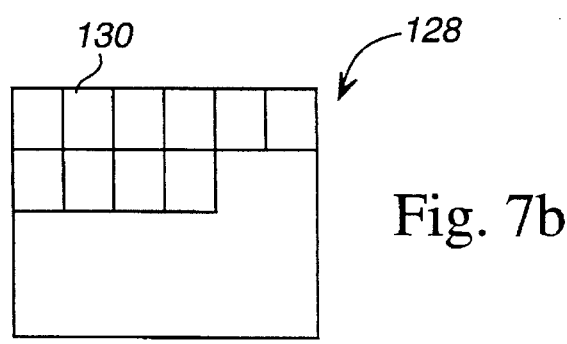
Figure 7C:
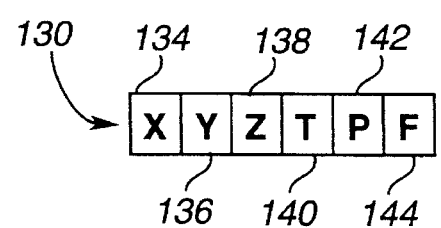

FIG. 7a shows a conceptual representation of an ink pool 120 employed in the present invention. Again, the ink pool is simply an area in memory where linked objects can be stored for subsequent retrieval. The ink pool holds a series of stroke objects represented by boxes 122, 124, and 126. Each stroke object contains information concerning a distinct stroke trajectory associated with the stylus on the tablet as indicated by the different geometric strokes shown within the boxes of FIG. 7a. FIG. 7b illustrates a stroke object 128 containing a series of packet objects including packet object 130. The individual packet objects are stored sequentially in the stroke object. FIG. 7c illustrates a single packet object 130. As noted above, the packet objects contain positional information such as the x, y, and z Cartesian coordinates 134, 136, and 138 of the stylus. Other information might include the tilt T of the stylus with respect to the tablet 140, whether the stylus is "in proximity" P of the tablet 142, and whether a special stylus function F has been activated 144, etc. Although the packet object 130 has been shown with six fields for information, some packets may have a different number of fields. For example, in some systems the in proximity field may not be provided. In other systems, additional fields may be provided such as the stylus ID, the time when the point was made, the pressure of the stylus on the tablet, etc.

Figure 8:
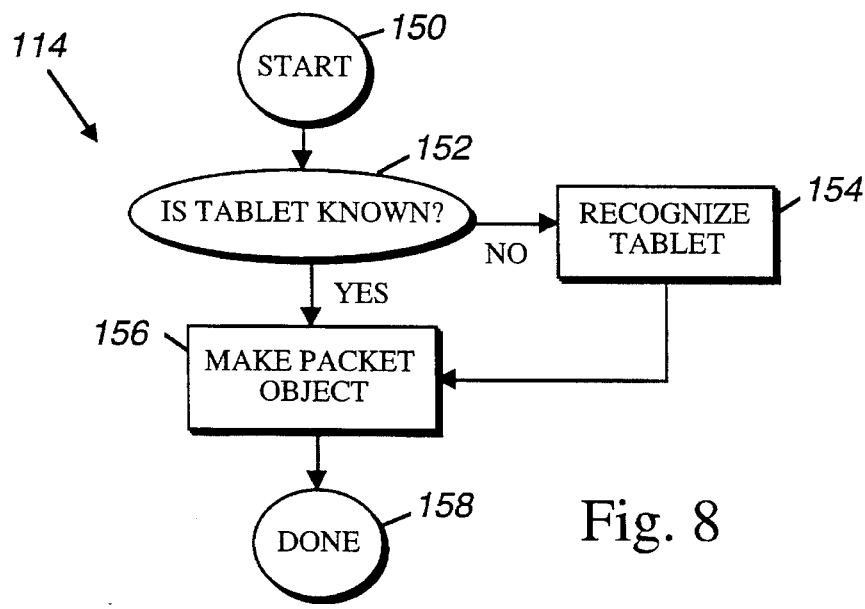
FIG. 8 is a process flow diagram showing how a packet object is prepared from tablet data in accordance with this invention.

FIG. 8 details the process by which a packet object is prepared from tablet data (process step 114 of FIG. 6) according to a preferred embodiment of the present invention. The procedure begins at step 150 and proceeds to decision step 152 where the system determines whether the tablet is known. As noted, the various commercial tablets produce tablet data having different formats. Thus in order to properly interpret the tablet data and convert it to a packet objects, the system must first know from what type of tablet it is receiving data. If the type of tablet has already been determined, the system knows what tablet data format to expect and needs not spend resources making that decision. Thus, if step 152 determines that the tablet type is known, the logic proceeds to process step 156 where it makes a packet object. This simply involves identifying the relevant positional information from the tablet data and packaging that data into the appropriate compartments in a standardized packet object. At this point, the process of making a packet object is complete as indicated at step 158.

If the system finds at decision step 152 that the tablet type is not known, it proceeds to process step 154 where the tablet type is recognized. This step may be accomplished by various methods such as requesting identification from the tablet itself or matching the tablet data to templates corresponding to the various tablet data formats. One preferred method is detailed in FIG. 9a. After the tablet is recognized at step 154, process control proceeds to step 156 where the packet object is made.

Figure 9A:
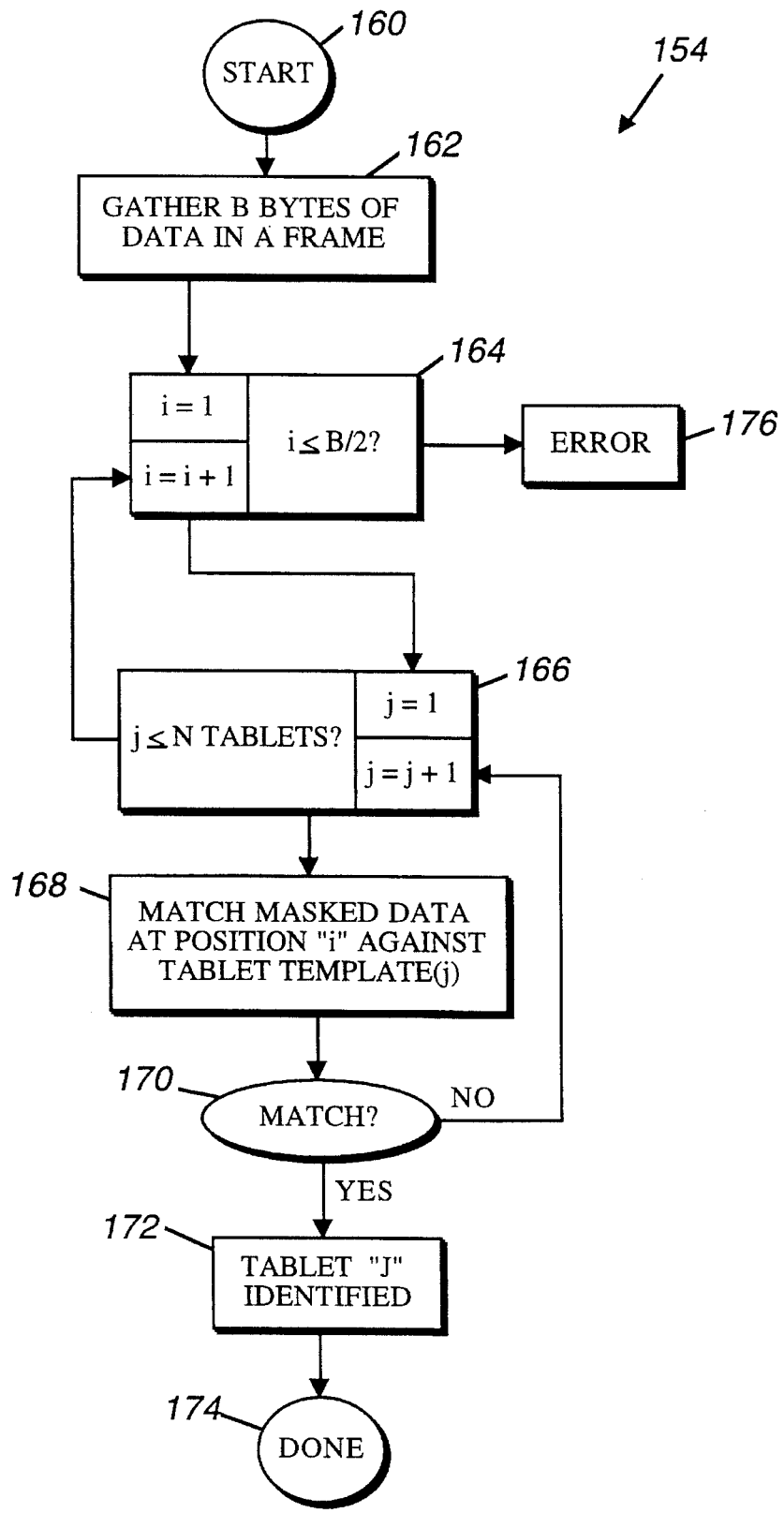
FIG. 9a is a process flow diagram showing how a system of this invention recognizes the type of dual-function display from which it is receiving data.

FIG. 9a details a preferred method of recognizing a tablet from the tablet data it generates. The process begins at step 160 and proceeds to step 162 where the system gathers B bytes of tablet data in a "frame". B is an arbitrary length selected to be twice as long as the data length necessary to unambiguously identify each of the available tablet types. Thus if B is 20 bytes, a 10 byte sequence of tablet data should be sufficient to identify each type of available tablet. It should be noted that the B bytes of tablet data used to recognize the tablet most likely contains the same kind of positional information used to produce packet objects. After the B bytes of tablet data are gathered, an iterative loop step 164 initializes a data "mask" position counter i to one and compares that counter to the variable B/2. The mask isolates a B/2 section of tablet data from the frame. If i is less than or equal to B/2, the process moves to an iterative loop step 166 which controls a loop where the gathered tablet data is compared against one or more templates for the available tablets. Each template contains a structure (sequence of 1s and 0s) that is uniquely characteristic of the tablet data from a specific type of tablet. Iterative loop step 166 initializes a tablet template counter j to one and compares it to the variable NTABLETS. NTABLETS represents the number of tablet templates in a template library (i.e. the number of available tablets that the system can work with). As long as j is less than or equal to the variable NTABLETS, the data beginning at the its position of the mask is matched against tablet template(j) at process step 168. After step 168, the system determines whether the template matches the masked data under consideration at decision step 170. If so, the tablet is identified as tablet "J" in the template library at process step 172 and the procedure is completed at step 174.

If on the other hand, template(j) does not match the frame(i), process control moves from step 170 to iterative loop step 166 where j is incremented by one. From there, the masked tablet data is matched against the next template(j). This process is repeated until a match is found or all NTABLETS templates are considered, whichever occurs first. If a match is found, the system has identified the tablet as tablet J and the process is completed at step 174. If no match is found, template counter "j" is greater than NTABLETS and process control returns to iterative loop step 164. There the mask is shifted one byte downstream in the B bytes of data (i.e., i is incremented by one). This new sequence of data—which contains B/2-1 bytes of tablet data from the previous frame plus one new byte—is then brought to iterative loop step 166 where template counter j is again initialized to one and the template matching loop begins. If no matches are found with the new sequence at tablet data, the system returns to iterative loop step 164 and again increments i by one and shifts the mask one byte further downstream. This procedure continues until a match is found. If the frame is shifted B/2 times and no match is found, then iterative loop step 164 moves to step 176 where an error is registered. Because each type of tablet should be identifiable from a B/2 frame of data, an error will have resulted if no match is found.

FIG. 9b shows a hypothetical eight byte frame of data that might be used with the method of this invention. This frame is taken from the tablet data sent from the tablet to the tablet driver. Templates shown in FIGS. 9c and 9d each represent data sequences that are unique to a particular type of tablet. Note that both templates are four bytes long, or half the length of the frame. As described in connection with the process depicted in FIG. 9a, a mask isolates one half of the data in the frame. In this case, the mask might start at the left end of the frame and isolate the data 1,0, 1,1. This sequence does not match either of the templates. Next, according to the above process, the mask moves by one bit downstream to isolate the data 0,1,1,0. As can be seen, this matches template(1) shown in FIG. 9c, thus indicating that the tablet sending data is of the type defined by template(1). It should be noted that the no four byte sequence of data from the frame matches template(2) shown in FIG. 9d.

Figure 10:
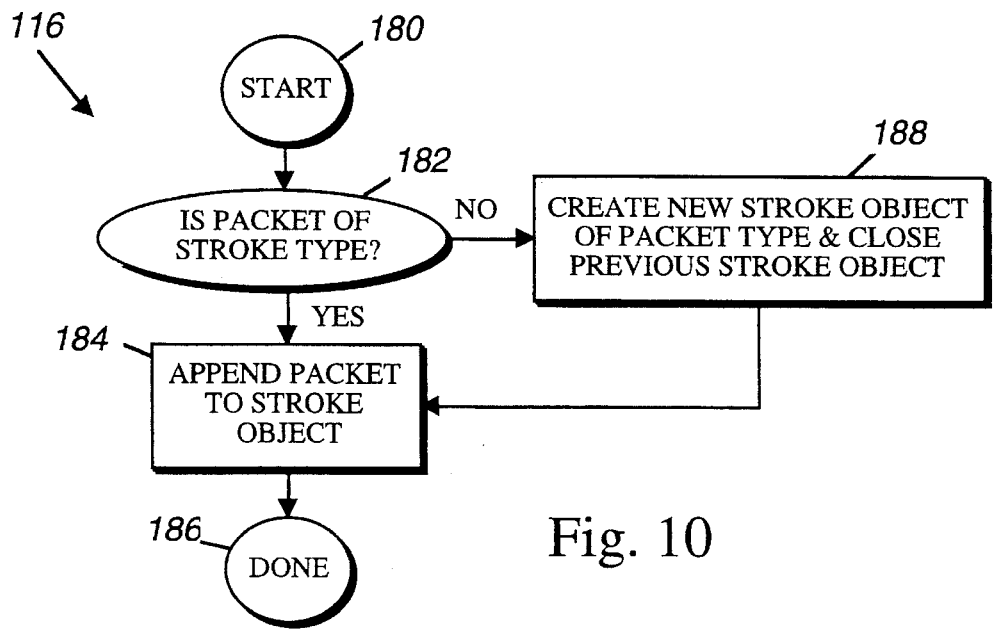
FIG. 10 is a process flow diagram showing how a stroke object containing packet objects is prepared in accordance with this invention.

As explained in FIG. 6, after the system makes a packet object (and identifies the tablet), it makes a stroke object (step 116). This procedure is detailed in FIG. 10. The process is started at step 180 and proceeds to a step 181 where the first packet of a new stroke object is received. Thereafter, a decision step 182 determines whether the packet object is of the same stroke type as the stroke object in progress. As noted above, each packet object has a packet type and each stroke object has a stroke type determined by the most recent stroke event. Thus, the packet type might be "in proximity," "stylus down," etc. Each packet object received after the most recent stroke event will be of a single type until the user causes a transition (i.e. another stroke event). For some time thereafter, the packet objects will be of a different stroke type defined by the new stroke event.

If the system determines that the packet object and stroke object are of the same type at step 182, the packet object is appended to the stroke object in progress at step 184. Process control then returns to step 181 where the next packet object is received. If it is a packet of the same stroke type as the stroke in progress, step 184 is performed as before. This process (looping through steps 181, 182, and 184) is repeated until a packet of a different stroke type is received. At that point, the query at decision step 182 is answered in the negative and a process step 188 creates a new stroke object (of the same type as the new packet object) and closes the previous stroke object (of the same type as the previous packet object). At this point, the application is notified that a stroke object has been completed in a step 185 and the process is completed at step 186. Each new packet object processed thereafter will be appended to the new stroke object (now the stroke object in progress) until a packet object of a different type is encountered. This, of course, reflects a transition in the stylus tablet interaction.

Figure 11A:
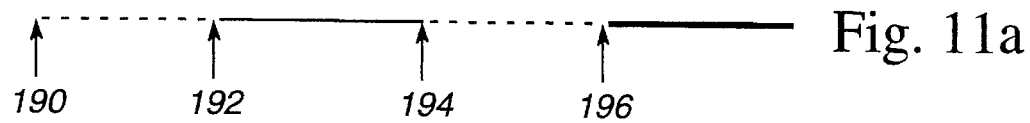
FIG. 11a is a time line showing various stroke events that may be encountered as the stylus moves with respect to a tablet.
Figure 11B:
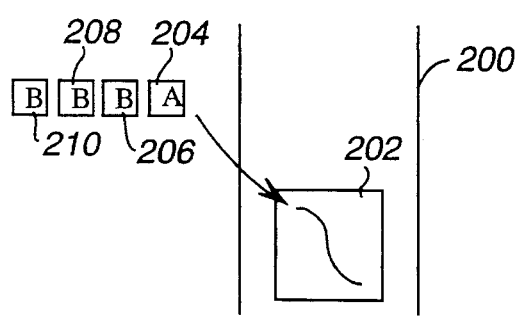
FIGS. 11b–11e are block diagrams showing how packets of different types are incorporated into stroke objects within an ink pool.
Figure 11C:
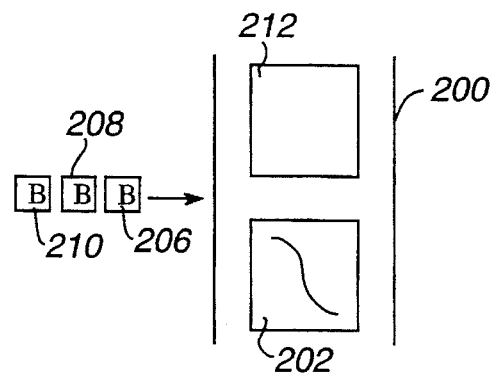

FIGS. 11a–11c illustrate the connection between stroke events at the stylus-tablet physical level and the creation of stroke objects at the stroke manager level. In FIG. 11a, a hypothetical time line is presented showing a stylus-tablet interaction including four stroke events. Initially, the stylus is too far away from the tablet to register a response. Then at stroke event 190, the stylus passes a threshold distance and becomes "in proximity" of the tablet. From that point as the stylus is moved over the tablet, the tablet generates tablet data for an in proximity stroke represented by the dashed line between 190 and 192. At 192, a new stroke event occurs. This is typically the time when the stylus first touches the tablet. From that point until stroke event 194, the tablet data is of the stylus down type as represented by the solid line between stroke events 192 and 194. During this period, the user is moving the stylus on the tablet surface. At stroke event 194, a new transition occurs. Here, the stylus is removed from the tablet and returns to its initial in proximity state as shown by the dashed line. After some time in that state, the user moves the stylus to yet another state at stroke event 196. This might be where the user flips a toggle on the stylus barrel to initiate a new function such as forcing the stroke to be drawn along the x or y axis only. The stroke type drawn thereafter is represented by the bold line shown after 196 in FIG. 11a.

Figure 11D:
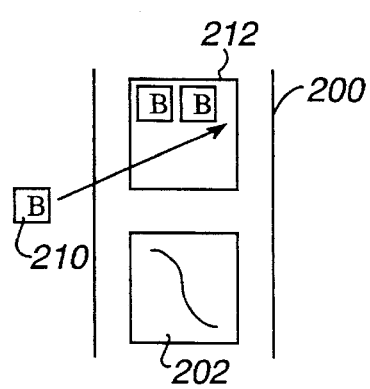
Figure 11E:
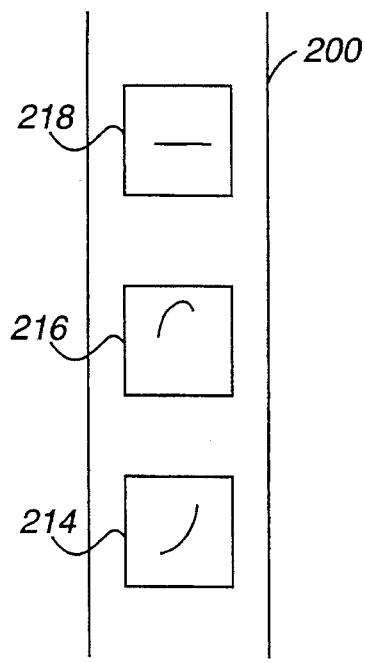

In FIG. 11b, a series of packet objects 204, 206, 208, and 210 are shown as they are about to be added to ink pool 200 by the stroke manager. Several packet objects of packet type "A" have been appended to stroke object in progress 202 (also of type A) prior to object 204. Because packet object 204 is of type A, it too is appended to stroke object 202 as shown in FIG. 11b. In FIG. 11c, packet object 206 is to be added to the ink pool. The stroke manager compares this packet's type with that of current stroke object 202. Because packet object 206 is of type B while stroke object 202 is of type A, a new stroke object 212 is created and stroke object 202 is closed (see step 188 of FIG. 10). As shown in FIG. 11d, packets 206 and 208 are appended and packet object 210 is being appended to stroke object 212. FIG. 11e shows an ink pool having multiple stroke objects stored therein. As shown, each of stroke objects 214, 216, and 218 contain positional information representing a different stroke shape. If these strokes were created in sequence from a continuous stream of tablet data, stroke 216 must be of a different type than either of strokes 214 and 218. Strokes 214 and 218 may or may not be of the same type.

To this point, the discussion has focused on the system's treatment of tablet-type data. As shown in FIG. 5, however, the stroke manager may be invoked at step 96 by either a stroke command or tablet-type data. When a stroke command is issued, the command must be processed as indicated at step 106 in FIG. 5. Applications typically collect stroke objects for many different reasons. One of the reasons can be to form a set of stroke objects to pass to a handwriting recognizer. Alternatively, the application could gather a set of stroke objects and record them to disk such that at a later point in time the application can replay, i.e. display again, the collection of strokes objects (drawings). The application could also recognize the stroke objects as a type of command. For instance, if the stroke object is a scribble type stroke over a word the application might interpret the scribble stroke as a command to delete the underlying word.

Figure 12:
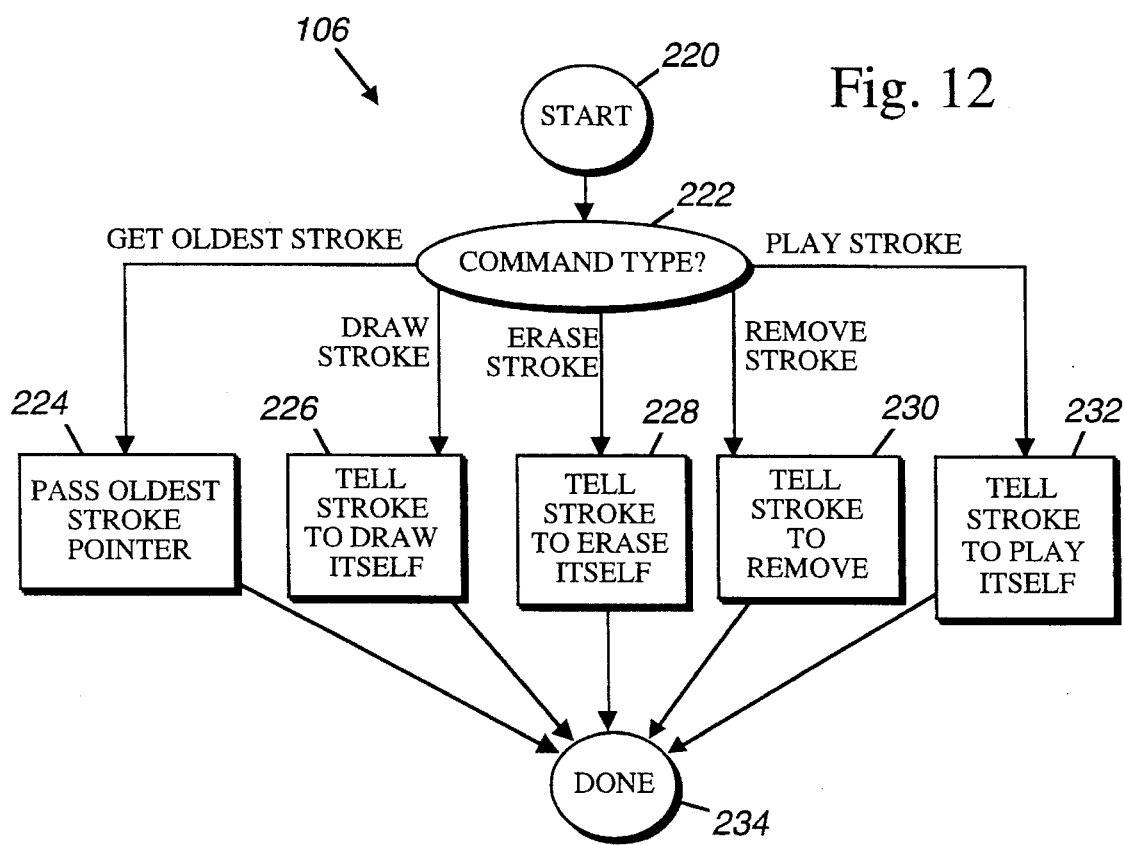
FIG. 12 is a process flow diagram showing how stroke commands from applications to stroke objects are processed according to the present invention.

The details of processing a stroke command are provided in FIG. 12. The process is started at step 220 and proceeds to conditional step 222 where the command type is determined. In preferred embodiments, the command types include the following: "get oldest stroke," "draw stroke," "erase stroke," "remove stroke," and "play stroke." These commands are implemented—in the order listed above—at process step 224 (pass oldest stroke pointer), process step 226 (tell stroke to draw itself), process step 228 (tell stroke to erase itself), process step 230 (tell stroke to remove itself), and process step 232 (tell stroke to play itself). After any one of these process steps is performed, the procedure is completed as indicated at step 234.

Figure 13:
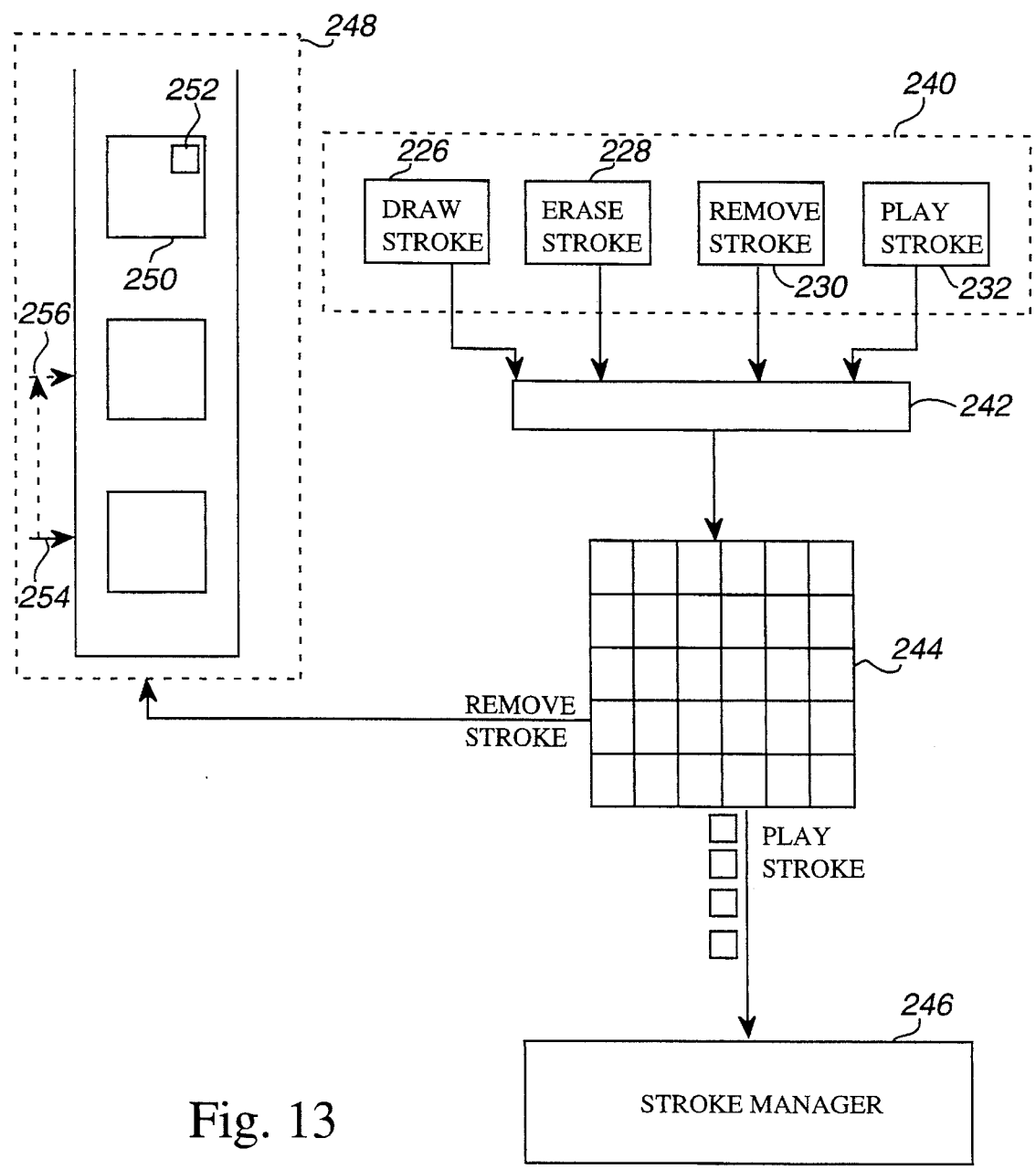
FIG. 13 is block diagram showing how the various process commands from applications are implemented.

FIG. 13 is an illustrates how each stroke command is implemented. Four of the commands—process steps 226, 228, 230, and 240—are directed to the stroke objects themselves. Each of these commands requires that the stroke object undertake some course of action. The stroke objects themselves, however, do not contain the script for this action. Rather, that information is held by one or more process objects 242. Thus, the process object first receives the stroke command (one of process steps 226, 228, 230, and 240) and then directs the appropriate stroke object 244 to undertake the required coarse of action. The "draw stroke" and "erase stroke" commands (226 and 228) simply require that the stroke object's coordinates be reproduced on the display (draw stroke) or removed from the display (erase stroke). The "remove stroke" command requires that the stroke remove itself from the ink pool so that it is no longer available. This is accomplished moving the ink pool pointer pointing to the stroke object to be removed to the next succeeding stroke object. Thus, if stroke object "l" is to be remove and object "l" is between objects "k" and "m," object k's pointer will be replaced with l's pointer. Thus, k which originally pointed to l now points to m. The "play stroke" command requires that the stroke object be "drawn" on the display in the same manner in which it was originally written or "inked" on the tablet. To "play", a stroke, the packet objects making up the stroke object are fed to the stroke manager in exactly the same order in which they were added when the stroke object was created. Thus, the stroke manager receives a stream of packet objects from a stroke object just as if it was receiving them from a tablet driver when the stroke object was originally created. Thus, the stroke is "played back."

Finally, the command to "get oldest stroke" simply requires passing the pointer from the oldest stroke. The oldest stroke is identified and its pointer is passed back to the stroke manager. As shown in FIG. 13, the oldest stroke object is located at the bottom of the ink pool 248. Other stroke objects including stroke object 250 with packet object 252 are also shown within ink pool 248 in FIG. 13. In executing a "get oldest stroke" command, the pointer 254 to the oldest stroke object is simply replaced with the pointer 256 to the next oldest stroke and the oldest stroke is removed.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. A method of processing outputs from an input tablet, the method comprising the steps of:

forming a plurality of data structures from outputs of an input tablet;

storing said data structures in an ink pool memory of a computer system, the ink pool memory being independent of at least one application program running in the computer system;

creating multiple stroke objects from the data structures in the ink pool memory;

determining whether said at least one application program is stylus-aware; and issuing one or more stroke commands to the multiple stroke objects within the ink pool if the application is stylus-aware, wherein one or more of the stroke commands include a step of producing an image of a stroke object on a computer display.

2. The method of claim 1 wherein the application issues the stroke commands to the stroke objects in the ink pool and wherein the stroke objects receiving the stroke commands carry out the commands without being copied to the application.

3. The method of claim 1 further comprising a step of sending the stroke object to a cursor control if the application is not stylus-aware, the cursor control moving a cursor on the tablet according to a path defined by the stroke object.

4. The method of claim 1 wherein the step of creating the multiple stroke objects from data structures in said ink pool memory includes the following steps:

receiving outputs from the input tablet;

making packet objects from the outputs, the packet objects including positional information of the stylus with respect to the tablet; and making the multiple stroke objects from the packet objects.

5. The method of claim 4 wherein the packet objects include an x and a y Cartesian coordinate of the stylus on the tablet.

6. The method of claim 5 wherein the packet object also includes one or more other pieces of information selected from the group consisting of the z Cartesian coordinate, the proximity of the stylus to the tablet, the pressure of the stylus on the tablet, and the tilt of the stylus with respect to the tablet.

7. The method of claim 4 wherein each of the multiple stroke objects and each of the packet objects have a characteristic stroke type and wherein the step of making the one or more stroke objects from the packet objects includes the following steps:

determining the stroke type of each packet object;

appending the packet object to a stroke object being created if the packet object is of the same stroke type as that stroke object; and creating a new stroke object and closing the stroke object previously being created if the packet object is of a different stroke type than the stroke object previously being created, the packet object being incorporated in the new stroke object.

8. The method of claim 7 wherein the characteristic stroke type is selected from the group consisting of proximity strokes, stylus-down strokes, and stylus-function strokes.

9. The method of claim 8 wherein the stylus-function strokes are initiated by a method that includes a step of pushing a button on the stylus.

10. The method of claim 8 wherein proximity strokes are initiated by a method that includes a step of bringing the stylus to within at most about one inch from the tablet.

11. The method of claim 1 further comprising the following steps:

determining whether a tablet type has been established; and recognizing the tablet type if it has not been established.

12. The method of claim 11 wherein the tablet type is recognized by comparing tablet outputs with tablet templates from a library of tablet templates wherein the tablet templates represent unique sequences of data particular to each tablet type in the library.

13. The method of claim 1 wherein the step of issuing one or more stroke commands to the one or more stroke objects within the ink pool includes the following steps:

determining which type of stroke command is issued by the application; and performing the issued stroke command.

14. The method of claim 13 wherein the stroke commands are selected from the group consisting of passing the oldest stroke object pointer, instructing a stroke object to draw itself, instructing the stroke object to erase itself, instructing the stroke object to remove itself, and instructing the stroke object to play itself.

15. The method of claim 14 wherein the stroke commands that instruct a stroke object to perform an operation on itself include the following steps:

sending the stroke command to a process object;

sending instructions from the process object to the particular stroke object to which the stroke command is directed.

16. The method of claim 14 wherein the stroke command of instructing the stroke object to remove itself includes a step of redirecting a pointer within the ink pool from the stroke object to be removed to the next succeeding stroke object within the ink pool.

17. A method of inputting information into a stylus-aware computer system having a stylus and a tablet, the method comprising the following steps:

moving the stylus with respect to the tablet, the movement being divided into strokes separated from one another by stroke events, the strokes being defined by a collection of stylus-tablet interaction parameters between stroke events;

convening the strokes into tablet outputs which include the stroke events and stylus-tablet interaction parameters;

converting the tablet outputs into standardized packet objects containing the stroke events and the stylus-tablet interaction parameters; and creating stroke objects from the packet objects, each stroke object containing only those packet objects generated from tablet data between two successive stroke events, wherein the stylus-tablet interaction parameters include at least discrete positional information associated with the stroke, and wherein the stroke events include at least moving the stylus within proximity of the tablet, stylus down on the tablet, stylus up from the tablet, and stylus function change, such that each packet object includes at least a discrete position and an associated stroke event.

18. The method of claim 17, wherein stylus function change stroke events are initiated by a method that includes a step of pushing a button on the stylus.

19. The method of claim 17 wherein proximity stroke events are initiated by a method that includes a step of bringing the stylus to within at most about one inch of the tablet.

20. The method of claim 17 wherein multiple styluses are used with the tablet and wherein the tablet output includes a stylus identification.

21. The method of claim 17 wherein the tablet is one of several tablet types, and wherein the method further comprising a step of identifying the tablet type by examining the tablet output.

22. The method of claim 21 wherein the step of identifying the tablet type includes a step of matching fixed amounts of tablet output with tablet templates from a library of tablet templates wherein the tablet templates represent unique sequences of data particular to each tablet type in the library.

23. A computer system comprising:

processing means;

memory means coupled to said processing means;

input tablet means coupled to said processing means;

a computer implemented process running on said processing means and residing, at least in part, in said memory means;

means for determining whether said computer-implemented process is a stylus-aware application; and means for converting inputs from said input tablets to a form acceptable to said computer-implemented process if it is not of the type which expects inputs from said input tablet, the means for converting inputs including a stroke manager which creates stroke objects from the inputs from the input tablets, the stroke objects containing information used by the computer-implemented process.

24. The computer system of claim 23 further comprising an ink pool storing the stroke objects and residing, at least in part, in the memory means.

25. The computer system of claim 23 wherein the means for converting inputs from the input tablets includes a tablet driver which converts the inputs into packet objects used by the stroke manager to create stroke objects.

26. The computer system of claim 23 further comprising a stroke manager library file which includes information used by the stroke manager to determine how the computer-implemented process treats the inputs which have been converted to a form acceptable to the computer-implemented process.

27. The computer system of claim 26 further comprising means for using the inputs from the input tablets to control a cursor when the stroke manager determines that the computer-implemented process treats the inputs by controlling the cursor.

28. The computer system of claim 23 further comprising an event queue in communication with the computer-implemented process and containing information describing one or more events from input tablet means.

29. The computer system of claim 23 wherein the input tablet is one of a plurality of tablet types and wherein the computer system further comprises means for determining the type of the input tablet.

30. The computer system of claim 23 further comprising a stylus having one of a plurality of stylus types; and means for determining the stylus type of the stylus.

* * * * *